US012243304B2

(12) United States Patent
Ramanathan et al.

(10) Patent No.: US 12,243,304 B2
(45) Date of Patent: Mar. 4, 2025

(54) EVENT DETECTION IN VIDEO SURVEILLANCE

(71) Applicant: ObjectVideo Labs, LLC, Tysons, VA (US)

(72) Inventors: Narayanan Ramanathan, Chantilly, VA (US); Allison Beach, Leesburg, VA (US); Gang Qian, McLean, VA (US); Sima Taheri, McLean, VA (US); Weihong Yin, Great Falls, VA (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 391 days.

(21) Appl. No.: 17/683,820

(22) Filed: Mar. 1, 2022

(65) Prior Publication Data

US 2022/0319172 A1 Oct. 6, 2022

Related U.S. Application Data

(60) Provisional application No. 63/168,461, filed on Mar. 31, 2021.

(51) Int. Cl.
G06V 20/40 (2022.01)
G06T 7/246 (2017.01)
G06V 20/52 (2022.01)
G06V 40/10 (2022.01)

(52) U.S. Cl.
CPC ............. *G06V 20/44* (2022.01); *G06T 7/248* (2017.01); *G06V 20/52* (2022.01); *G06V 40/10* (2022.01)

(58) Field of Classification Search
None
See application file for complete search history.

(56) References Cited

PUBLICATIONS

"Amazon Rekognition FAQs" pp. 1-20, aws.amazon.com. Online. Sep. 9, 2020, retrieved from <URL: https://web.archive.org/web/20200909060302/https://aws.amazon.com/rekognition/faqs/>. (Year: 2020).*

\* cited by examiner

*Primary Examiner* — Lennin R Rodriguezgonzalez
(74) *Attorney, Agent, or Firm* — Fish & Richardson P.C.

(57) ABSTRACT

Methods, systems, and apparatus, including computer programs encoded on a computer storage medium, for retroactive event detection. The methods, systems, and apparatus include actions of obtaining an image captured by a camera at a current time, determining that the image depicts a change in a region from a previous image captured by the camera at a previous time, determining, based on determining that the image depicts the change in the region, whether the change depicted in the image is of a known object type, determining, based on the determination that the change depicted in the image is of a known object type, whether the change does not correspond to a previously detected event, and determining, based on the determination that the change does not correspond to a previously detected event, whether the images captured by the camera between the current time and the previous time depict an event.

18 Claims, 7 Drawing Sheets

Previous Background Image 422

Current Background Image 424

Scene Change Analyzer Output

EVENT DETECTION IN VIDEO SURVEILLANCE

CROSS-REFERENCE TO RELATED APPLICATIONS

This application claims the benefit of U.S. Provisional Application No. 63/168,461, filed Mar. 31, 2021, which is incorporated by reference in its entirety.

BACKGROUND

Many properties are equipped with monitoring systems that include sensors and connected system components. Video surveillance systems can be equipped with event detection solutions that serve the purpose of continuously processing the video feed and detecting events that involved objects of interest (such as person, car, animal, package) that take place within the area under surveillance.

SUMMARY

In general, the subject matter described in this disclosure can be embodied in methods, apparatuses, and systems that performs retroactive event detection in video surveillance based on scene changes. A retroactive event detection system may include tools that help identify changes observed in a scene and assess the state of the scene as either event-driven or otherwise. A state of the scene is an appearance of the scene including observed appearances of various objects within the scene. Changes to the state of a surveillance scene can happen in the form of addition or removal of common object-types, for example, packages, flower pots, door mats, vehicles, trash cans and other typical household items within the field of view of a camera. Alternately, the same object types may appear simply displaced in the scene. In some embodiments, the changes can happen as a result of change of state of uncommon object types, for example, objects used for holiday decorations, or as a result of highly unusual, but benign events, for example, as 'someone spilt coffee on the porch' or 'pet animals knocking down an arbitrary object off the shelf.'

The retroactive event detection system can be integrated with a video surveillance system and periodically look for altered states of a background scene to correspond the timeline of a scene-change detection with that of an event detector's event timeline. In other words, the retroactive event detection system can determine a scene change observed at a particular time in the video surveillance data can be correlated to an event that was detected by the event detector and that occurred within a same time frame. In the absence of a timeline match, the system can determine that there have been false negative detections by the video surveillance system (e.g., missed events), and then initiate a re-analysis of a historical video feed corresponding to the timeline during which the scene-change was detected. The system can re-run event detection either using the default event detector with heightened sensitivity settings or using an alternative event detector that has been pre-selected for its high rate of recall thereby enabling retroactive event detection, if any.

In some implementations, scene-changes or activity-traces can be permanent or temporary changes made to scene entities (e.g., inanimate objects, humans/animals, or other features of the appearance of the scene) that could have resulted only from events that transpired recently in the scene. An activity-trace can be any altered state of scene entities within the field of view of the camera, e.g., where the inanimate object appears to be moved or re-arranged, (e.g., porch furniture, gate, flower pot, door mat). In another example, an activity-trace includes new scene patterns, for example, tire tracks seen on the driveway, foot prints on the driveway or front porch. In another example, an activity-trace includes an introduction or removal of scene objects, for example, a package that has appeared in the scene or is seemingly removed from the scene, a car that has appeared parked on the driveway, while the actual event of the car getting into the driveway had not been detected, and trash cans in the front yard appearing moved.

One innovative aspect of the subject matter described in this specification is embodied in a method that includes obtaining an image captured by a camera at a current time, determining that the image depicts a change in a region from a previous image captured by the camera at a previous time, determining, based on determining that the image depicts the change in the region, whether the change depicted in the image is of a known object type, determining, based on the determination that the change depicted in the image is of a known object type, whether the change does not correspond to a previously detected event, and determining, based on the determination that the change does not correspond to a previously detected event, whether the images captured by the camera between the current time and the previous time depict an event.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. In some implementations, determining, based on the determination that the change depicted in the image is of a known object type, whether the change does not correspond to a previously detected event includes determining whether an event was detected between the previous time and the current time, and based on determining that an event was not detected between the previous time and the current time, determining that the change does not correspond to a previously detected event.

In some implementations, determining, based on determining that the image depicts the change in the region, whether the change depicted in the image is of a known object type includes determining that the change is of a package type, and determining whether an event was detected between the previous time and the current time includes determining whether a package delivery event was detected between the previous time and the current time.

In some implementations, determining whether an event was detected between the previous time and the current time includes determining whether an event associated with a presence of a human was detected between the previous time and the current time.

In some implementations, obtaining an image captured by a camera at a current time includes determining that a human is not detected in the image.

In some implementations, the methods further include, based on determining that the images captured by the camera between the current time and the previous time depict an event, providing an indication of the event.

In some implementations, the methods further include, based on determining that the images captured by the camera between the current time and the previous time do not depict an event, determining to use the image to determine whether a future image depicts a change in a region.

Particular embodiments of the subject matter described in this specification can be implemented so as to realize one or more of the following advantages. The retroactive event detection system, by initiating a re-analysis on the video stream from a recent timeline, helps identify events that may have been missed by the event detector under its default settings, which can reduce false negative detections. Further, by assessing the frequency of retroactive event detection, e.g., how frequently the system is retrieving missed events, the video surveillance system can improve performance by fine-tuning the default event detector or replacing the event detector with one that has better recall.

In some embodiments, the retroactive event detection system can be utilized to reduce power usage and thereby reduce heating of an embedded device (e.g., a camera) during extreme temperatures by de-activating an event detection mode for the embedded device. The retroactive event detection system can continue to run a retroactive event detection process to capture discrepancies in background images and detect events.

In some embodiments, the retroactive event detection system can be utilized with a camera that may not be capable of running a detection algorithm, where the system can buffer video segments and check for a discrepancy, then only send the video segments with discrepancies to the cloud for processing. All other segments could either be stored on an SD card or discarded.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

A video surveillance system including multiple cameras can capture events occurring at a property. Each camera can include object detection software which can capture event data for events detected within a scene captured by the camera. The video surveillance system additionally includes a retroactive event detection system to perform retroactive event detection for changes observed in the background of the scene which may not have previously been correlated with events detected by the system. Retroactive event detection can be utilized to determine if scene changes, e.g., new objects, interaction with existing objects, removal of scene objects, new scene patterns, etc., are related to previously detected events or if a possible false negative detection has occurred, where the video surveillance system did not detect an event including the scene change.

Figure 1:
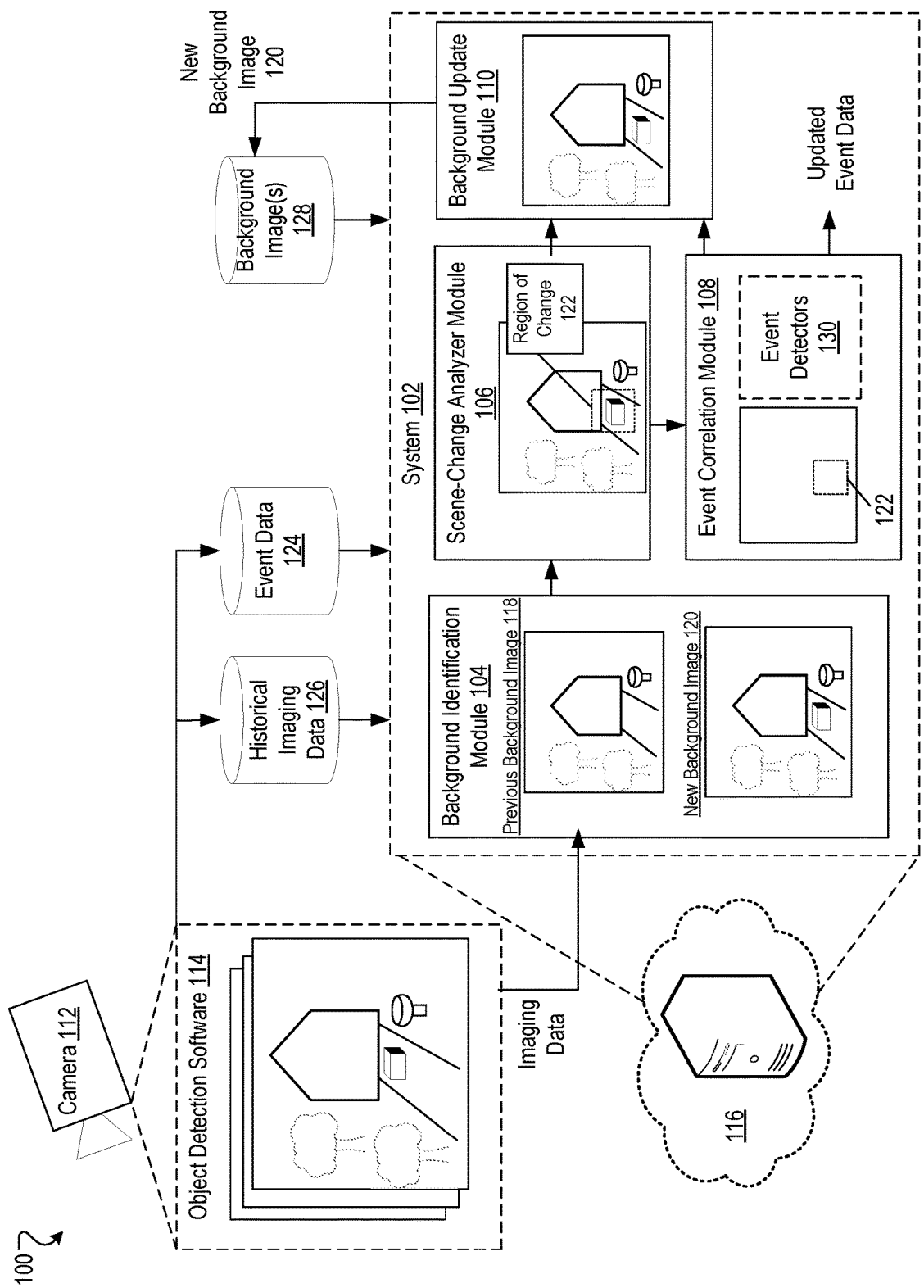
FIG. 1 is a diagram depicting an example operating environment of a retroactive event detection system.

FIG. 1 is a diagram depicting an example operating environment 100 of a retroactive event detection system 102. System 102 can be hosted on one or more local servers, a cloud-based service, or a combination thereof. System 102 includes a background identification module 104, a scene-change analyzer module 106, an event correlation module 108, and a background update module 110. Though described herein as a background identification module 104, a scene-change analyzer module 106, an event correlation module 108, and a background update module 110, the operations can be performed by more or fewer modules.

In addition to the operations described below with reference to the retroactive event detection system 102, the system 102 or another system in data communication with the system 102 is configured to receive video data input from cameras 112 including object detection software 114 to detect objects within video data, e.g., video clips and/or images, captured by the camera 112 of the scene. Camera 112 can be a surveillance camera located on a property, e.g., a home, and oriented to capture a scene within a field of view of the camera 112.

In some implementations, object detection software 114 can include one or more machine-learned models for identifying and classifying objects within the scene. For example, object detection software 114 can include facial recognition software, human/animal models, and the like. Object detection software 114 can detect one or more objects within an image, set of images, or clips captured by camera 112.

Network 116 is configured to enable the exchange of electronic communications between camera 112 and the system 102. The network 116 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Network 116 may include multiple networks or subnetworks, each of which may include, for example, a wired or wireless data pathway. The network 116 may include a circuit-switched network, a packet-switched data network, or any other network able to carry electronic communications (e.g., data or voice communications). For example, the network 116 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 116 may include one or more networks that include wireless data channels and wireless voice channels. The network 116 may be a wireless network, a broadband network, or a combination of networks includes a wireless network and a broadband network.

Camera 112 captures imaging data (e.g., video clips) and provides captured imaging data to system 102. The system 102 can receive the imaging data and determine if the captured imaging data is representative of a background image. A background image is an image in which the system 102 has determined that the scene does not include (or has a threshold of confidence that the scene does not include) an object of interest. An object of interest can be for example, a moving object, (e.g., vehicle or human moving through the scene), a new or unexpected object, (e.g., a package), or another object that might be of particular interest to the homeowner, e.g., a delivery vehicle in the driveway. In some implementations, background identification module 104 can utilize motion analysis and object detection software to monitor a video feed from camera 112 and determine that there is no detectable activity in the scene. Detectable activity can include, for example, humans/animals/vehicles moving around the scene. Detectable activity can include inclement weather, e.g., rainstorm, snow, etc., that can result in movement triggers in the scene.

In some implementations, the determination if the captured imaging data is representative of a background image can be performed at the camera 112 using object detection software and motion analysis at the camera 112. In this embodiment, imaging data determined to be representative of a background of the scene for the camera 112 can be provided to the system 102.

When the system 102 determines that there is no detectable activity in the scene, a background image can be captured and provided to the background identification module 104 to initiate a retroactive event detection process. In some implementations, a background image is captured at periodic intervals, e.g., every 5 minutes, every 10 minutes, every 2 minutes. The interval between capturing the background images can depend in part on cost-benefit analysis, e.g., how much additional information is captured versus cost of running a retroactive event detection process.

In some implementations, a background image is captured to initiate a retroactive event detection process when the system 102 is otherwise idle, e.g., is not actively engaged in other processes, or has a computational load less than a threshold volume (e.g., less than 10% processing volume is utilized).

In some implementations, a binary search can be utilized to determine an interval for performing retroactive event detection process on captured video data. For example, a first interval can be set between a first time T0 and a second time T1 (e.g., T0 is 0 and T1 is 5 minutes) to perform retroactive event detection, and if a change in scenery is detected at T1, then another retroactive event detection process can be performed at T2 halfway between T0 and T1, e.g., at T2=2.5 minutes). The binary search can be repeated as needed until a video clip can be identified that captures the scene change.

In some implementations, a background image can be captured to initiate a retroactive event detection process in response to a trigger. More specifically, a retroactive event detection process can be initiated by the system 102 when the system 102 receives sensor data indicative of an event but fails to capture video data of the event. In one example, system 102 can receive sensor data from a door sensor for a door (e.g., door opens) but the system 102 does not otherwise register an event occurring in video data captured by a camera including the door within the field of view of the door. In this example, the system 102 may initiate a retroactive event detection process to determine if an event was missed in the imaging data captured by the camera.

Background identification module 104 can perform long-term background modeling utilizing captured imaging data of the scene. The long-term background modeling can include capturing of the scene background over a period of time in order to develop understanding of time-dependent scene changes, e.g., movement of shadows in the scene. The background identification module 104 can characterize a typical appearance of the scene within the field of view of the camera 112 in the absence of any moving objects in the foreground of the scene (e.g., moving person, car, animal, trees). A typical appearance of the scene can be determined, e.g., using scene segmentation, and determining, for each aspect of the scene, likely characteristics of the scene. For example, orientations of various static objects in the scene (e.g., a chair is located in a particular location or range of locations within the scene). In another example, a range of movement for an object/feature of the scene, (e.g., range of shadows cast by a tree, range of movement of a flag, etc.). The background identification module 104 can utilize captured background images over a period of time and under varying lighting conditions, weather patterns, etc., to build a background model that includes time-dependent background scene-changes.

Background identification module 104 receives a background image from a camera capturing a scene within the field of view of the camera 112 as input, and identifies a region of localized change within the scene captured in the imaging data, e.g., a video clip or collection of images, as output. In some implementations, background identification module 104 can identify regions of localized change by background subtraction and/or pixel subtraction to identify pixels in the new background image that have changed.

Background identification module 104 provides the background image 120 including an identified region of localized change within the scene as input to the scene-change analyzer module 106. The scene-change analyzer module receives the background image 120 with identified region of localized change as input and performs object detection, scene labeling (e.g., scene segmentation), and scene analysis to determine if localized changes detected in a scene background are typical or atypical. Further details of the scene-change analyzer module are found below with reference to FIGS. 2 and 3.

Scene-change analyzer module 106 can receive from the background identification model, a background image 120 and one or more regions of localized change 122 that are identified in the background image. The scene-change analyzer module 106 can provide as output, a determination as to whether the identified region of localized change 122 is due to a known or unknown object, and, in the case of an unknown object, can determine if an unknown object is due to a typical or atypical event. Further details of the operation of the scene-change analyzer module 106 are described with reference to FIG. 2 below.

The event correlation module 108 can receive, from the scene-change analyzer module 106, a determination that the region of localized change 122 is due to a known object or an atypical event as input. The event correlation module 108 can receive, as input, event data 124 for events captured by the cameras 112 and historical imaging data 126 captured by the camera 112, and provide, as output, updated event data 124. Updated event data can include event data correlating the localized region of change 122 can be correlated with a known event. Updated event data can include a new event that may have been previously missed by event detection software.

In some implementations, the event correlation module 108 can determine, for a particular localized region of change in the scene, that the scene change correlates to a known event in the event data 124. For example, a package identified at the front door of the home can be correlated with a delivery event in the event data 124 that occurred within a threshold of time of the package being detected in the scene (e.g., between capturing of the previous background image 118 and the capturing of the new background image 120).

In some implementations, the event correlation module 108 can determine, for a particular localized region of change in the scene, that the scene change does not correlate to a known event in the event data 124. Event correlation module 108 can utilize one or more event detector 130 to re-run historical imaging data capturing the scene of the camera 112 between time of capture of the new background image 120 and the previous background image 118. In other words, event detectors can be utilized to re-scan the historical imaging data 126 that was captured during a time period where the local scene change occurred. Event detectors 130 utilized by event correlation module 108 can include higher sensitivity, increased recall, or otherwise adjusted event detectors that are different than the detection software included at the camera 112. Further details of the operations of the event correlation module 108 are described below with reference to FIG. 2.

The background update module 110 can provide as output, an updated background image to include the new background image 120 in the stored background images 128 for the system 102.

Figure 2:
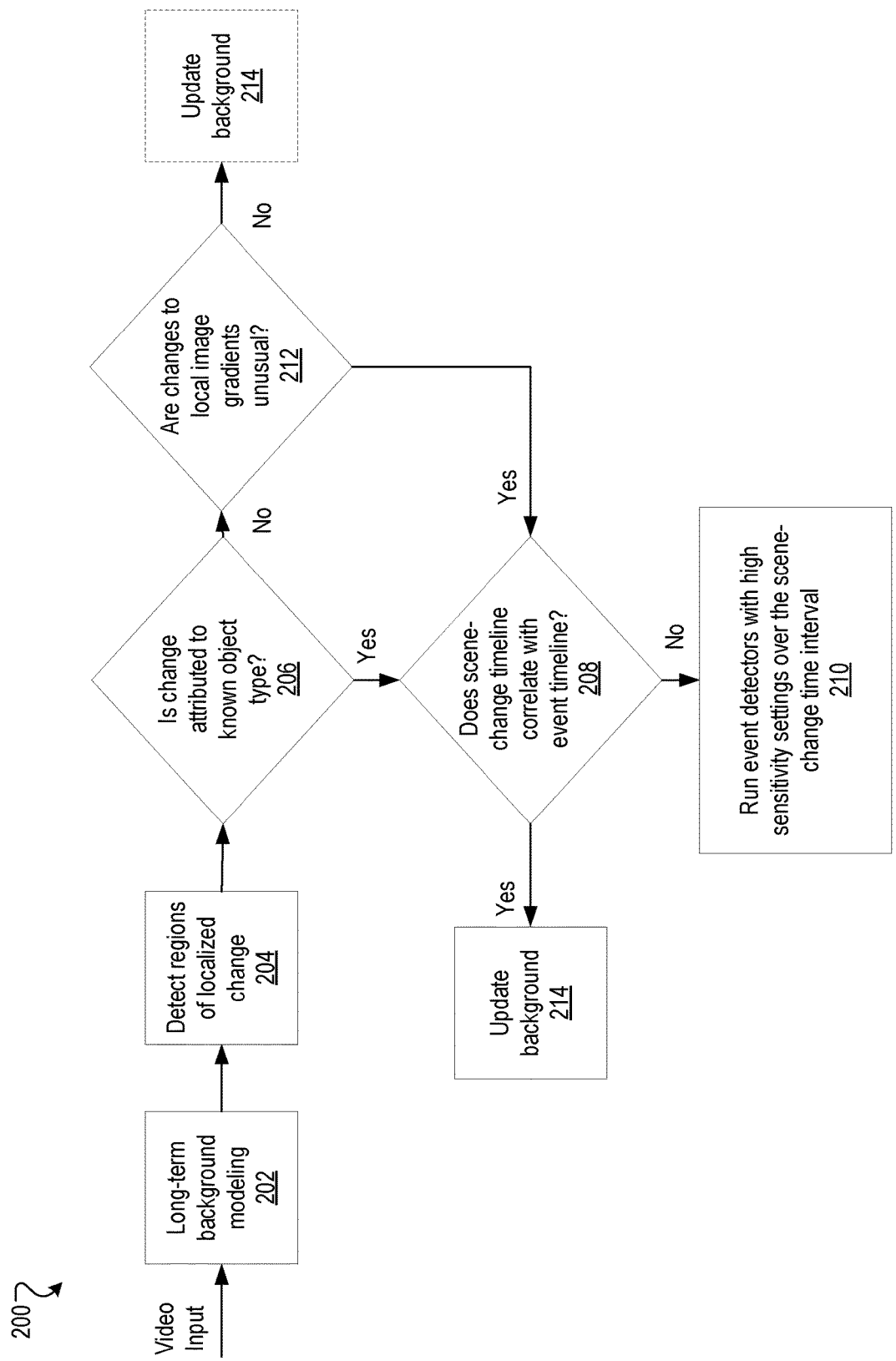
FIG. 2 is a flow diagram of an example process of the retroactive event detection system.

FIG. 2 is a flow diagram of an example process 200 of the retroactive event detection system. In step 202, video input from a camera, e.g., camera 112, capturing a scene within a field of view of the camera can be received by the system 102 to perform long-term background modeling. As described with reference to FIG. 1, the system 102 can capture background images over a period of time and generate a background model of the scene captured by the camera under various lighting conditions, weather patterns, seasons, etc. The background model can include, for example, appearance and timing of various shadows in the scene (e.g., shadows from tree branches in the afternoon) as they evolve over the period of a day and/or how they evolve over the different seasons (e.g., shadows resulting from winter sunlight vs. summer sunlight).

In step 204, the background identification module 104 can receive a new background image captured of the scene and identify a region of localized change with respect to a previously captured background image. As depicted in FIG. 1, determining areas of localized change can include performing scene change analysis between a previous background image and a current background image. In some implementations, detecting regions of localized change can be performed via background subtractions which highlights pixels in the image that have changed.

In step 206, the system 102 determines if the localized region of change is attributable to a known object type. Scene-change analyzer module 106 can perform object detection and labeling to identify known objects, e.g., doormat, flowerpot, mailbox, car, etc. In some implementations, the scene-change analyzer can include a multiple pre-trained object detectors to detect common objects, e.g., animals, vehicles, people, packages, etc. Object classification can be utilized to categorize detected objects into typical and atypical objects. Typical objects can be objects that are expected in the background of the scene and can be determined as typical based on the background model generated for the scene for the camera 112.

In some implementations, in response to step 206, the system 102 can determine that the localized region of change is attributable to a known object and proceed to step 208. In step 208, event correlation module 108 may analyze event data capturing events within the scene for the camera 112 and determine if the scene change (e.g., the identified object) correlates with an event recorded in the event timeline by the event data. For example, an object may be a package on a front porch of a home, where a correlated event is event data capturing a delivery person dropping the package off at the front porch. If the system 102 determines that the scene change correlates with an event captured by the event data, then the background update module 110 can update the background image for the camera to a new background image.

In some implementations, in response to step 206, the system 102 can determine that the localized region of change is not attributable to a known object and proceed to step 210. In step 210, the event correlation module 108 can re-run event detection processes on historical imaging data captured by the camera 112 between the time that the previous background image was captured and when the current background image was captured. In other words, the system 102 can determine if an event that correlates with the scene change was missed by an original event detection process for the scene change interval. The system 102 can utilize event detectors having higher sensitivity settings and/or increased recall compared to the originally utilized event detectors. As described above with reference to FIG. 1, the object detection module can utilize binary search method to re-run the historical imaging data captured by the camera 112 between a T=T0 timestamp when the previous background image was captured and a T=T1 timestamp (e.g., 5 minutes after T0) when the current background image was captured.

In some implementations, the scene-change analyzer module 106 can determine, in response to step 206, that the scene change is not attributable to a known object type and proceed to step 212. In step 212, the scene-change analyzer module 106 can utilize an image gradient-based change analysis tool to identify localized regions of change in the scene and determine whether the changes in the localized region are typical or atypical. The image gradient based change analysis tool can divide the scene into grids of size W×H and builds a gradient histogram that acts as a signature of edge patterns observed within the grid. When an object is introduced in the scene, the edge patterns pertaining to the grid can change such that the difference in the edge patterns can be utilized as a cue to identify a change in scene-state.

The image gradient-based change analysis tool can then determine whether the localized region of change is typical or atypical. In other words, the image gradient-based change analysis tool can determine if a scene-change detected by the system 102 can be a result of a newly introduced object or is as a result of sudden shadows that appeared in the scene (e.g., due to movement of the cloud cover). In this example, the former can be determined to be an atypical change and the latter can be classified as a typical change.

A typical event can include a normal background event, e.g., as determined by the background model. Typical events can include weather events (e.g., rain, clouds, snow, etc.), time/date events (e.g., shadows cast by trees or other nearby objects), or the like. Atypical events are events that are distinct from the background and/or are determined to not involve or be caused by background objects. In one example, an atypical event is a package delivery (e.g., package is detected on the door step). In another example, an atypical event is a vehicle parked in the driveway.

In some implementations, the image gradient-based change analysis tool can generate a gradient map of a scene within a field of view of the camera as a function of time. In other words, a gradient map is generated that tracks shadow patterns in the scene, e.g., how shadow patterns appear in the scene, how shadows move within the scene over the course of a day, and when shadows typically disappear, etc. The scene-analyzer module can utilize a generated gradient map to determine if localized regions including scene-changes are typical, e.g., associated with normal shadows, or atypical, e.g., associated with an event. In other words, the scene-analyzer module can generate a gradient map of the entire scene and perform analysis on localized regions including the scene-changes (and not on the entire scene).

The system 102 may determine, in response to step 212, that the changes to the local image gradients are usual or typical, e.g., due to regularly occurring shadows, and proceed to step 214. In step 214, the background update module 110 updates the background image to the new background image 120 and the system 102 can terminate the retroactive event detection process. For example, a gradient map can be utilized to identify if a scene-change is a shadow cast by a tree that occurs every day between 1-2 PM and then proceed to update the background image for the scene of the camera 112, terminating the retroactive event detection process.

In some implementations, the system 102 may access local weather data in real-time, such that the system can compare its scene-state-change timeline with a local weather timeline apart from the recent event-detection timeline in determining if a re-analysis of the recent video feed is required. For example, the system 102 can determine if a scene-state change is related to inclement weather (e.g., rainstorm) such that it may determine that the localized region of change is due to rain in the field of view of the camera and not necessarily as result of a new object in the scene.

In some implementations, in place of an image-gradient based change analysis tool, the system 102 can perform region matching using local features (e.g., fiducial points that are tied with strong gradients and/or ones that can repeatedly detected across illumination variations) to determine if regions of localized change are associated with atypical events or typical events. For example, edges of a building (e.g., walls of the home, fence line, etc.), can be utilized as fiducial points in the scene.

In some implementations, in response to step 212, the system 102 determines that a region of localized change is due to an atypical event, and proceeds to step 208. The event correlation module 108 can be invoked to determine if the atypical event can be correlated to an event detected by the video surveillance system. In some implementations, the atypical event can result from localized scene change due to an object that is unknown to the object classifiers (that the pre-trained classifiers have not seen before) such that the system 102. For example, an inflatable lawn decoration can be an object that is unknown to the object classifiers and results in a localized scene change that is not typical. In step 208, the event correlation module 108 can determine if the atypical event correlates to an event in the event data, similarly to as what was described with reference to a known object.

Figure 3:
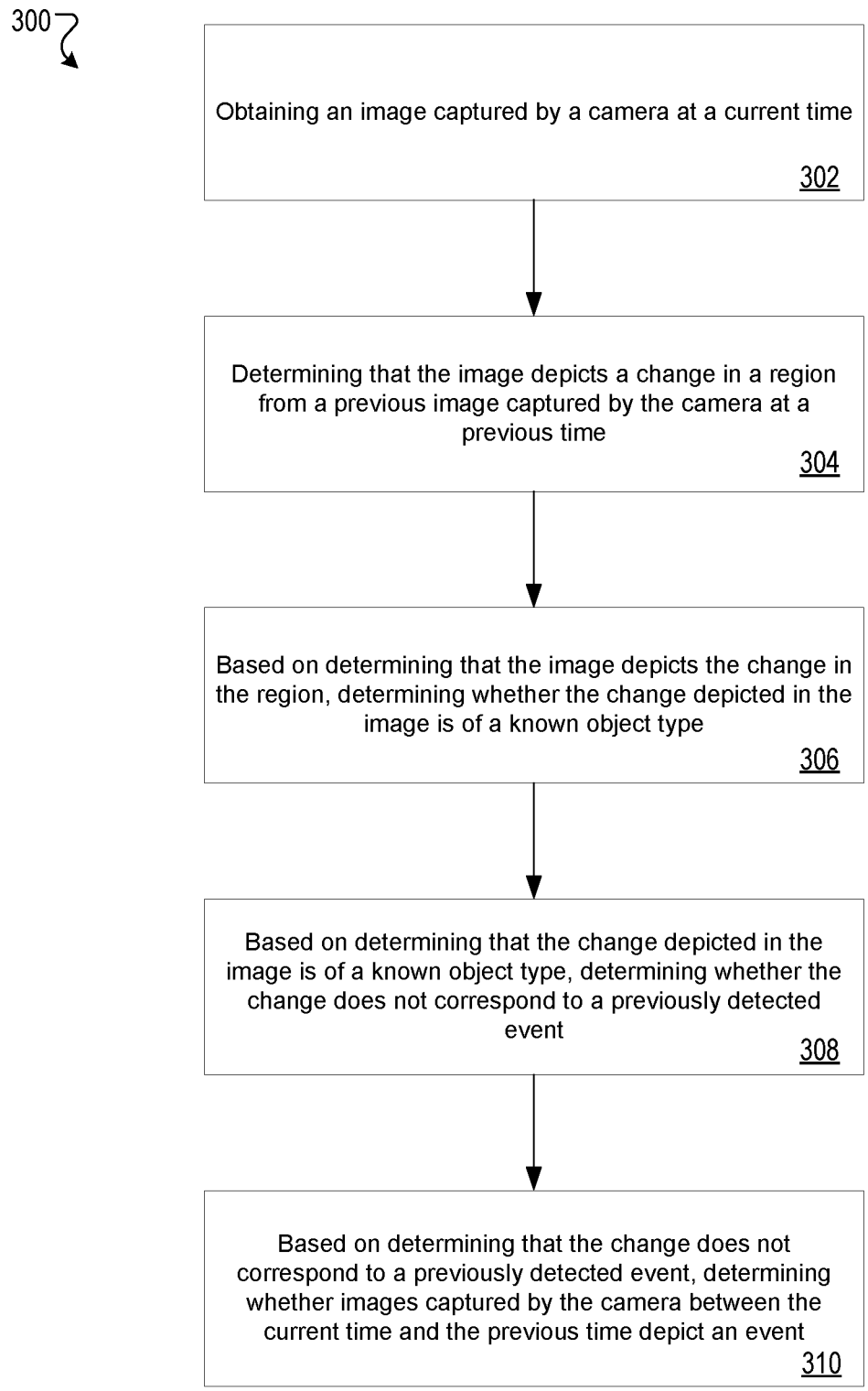
FIG. 3 is a flow diagram of another example process of the retroactive event detection system.

FIG. 3 is flow diagram of another example process 300 of the retroactive event detection system. The system obtains an image captured by a camera at a current time (302). For example, the system 102 may receive an image captured by the camera 112. In some implementations obtaining an image captured by a camera at a current time includes determining that a human is not detected in the image. For example, the camera 112 may determine that a human is not currently detected in view and, in response, provide the image of the view to the system 102 as a current background image.

Camera 112 can determine that there is no detectable objects/humans in the scene that are not part of the background of the scene, e.g., using object/human detection, motion detection, facial recognition techniques. The camera can periodically capture images of the background of the scene, e.g., every 5 minutes, and/or can capture image of the background of scene when the camera has a processor utilization below a certain threshold. The image or video clip captured by the camera can be provided to the system 102. The system determines that the image depicts a change in a region from a previous image captured by the camera at a previous time (304). System 102 can utilize a background identification module 104 to identify a region of localized change 122 between a previous background image 118 and a current (new) background image 120. In one example, background identification module 104 utilizes pixel comparison/subtraction to identify pixels that have changed between a previous background image 118 and a current (new) background image 120.

The system determines, based on the determination that the image depicts the change in the region, whether the change depicted in the image is of a known object type (306). A scene-change analyzer module 106 can determine, e.g., using object recognition software, facial recognition software, etc., whether the localized region of change 122 is a known object type. For example, the scene-change analyzer module 106 can determine that the region of localized change 122 is a package object-type located on a doorstep of the home. In another example, the scene-change analyzer module 106 can determine that the region of localized change 122 is a human and further, using facial recognition techniques, that the human is the homeowner of the home.

The system determines, based on the determination that the change depicted in the image is of a known object type, whether the change does not correspond to a previously detected event (308). An event correlation module 108 can determine, from event data 124, whether the object of known object type can be correlated to a previously detected event. For example, whether a package can be correlated to a delivery event, e.g., a delivery person dropping the package at the door step. In another example, whether an object that is a chair that has moved within the scene can be correlated with an event in the event data 124 of a person or otherwise (e.g., wind) moving the chair from a previous location to the new location within a scene.

In some implementations, determining whether the change does not correspond to a previously detected event includes determining whether an event was detected between the previous time and the current time and based on determining that an event was not detected between the previous time and the current time, determining that the change does not correspond to a previously detected event. For example, the event correlation module 108 may determine that an event was not detected between the time that the previous background image was captured and the current new background image 120 was captured and, in response, determine that a change does not correspond to a previously detected event.

In some implementations, determining whether the change depicted in the image is of a known object type includes determining that the change is of a package type, and determining whether an event was detected between the previous time and the current time includes determining whether a package delivery event was detected between the previous time and the current time. For example, the scene-change analyzer module 106 may determine that a package was not present in a particular region of the previous background image and was present in the particular region of the current background image, and the event correlation module 108 may determine that a package delivery event was not detected between the times when the previous background image was captured and the current background image was captured.

In some implementations, determining whether an event was detected between the previous time and the current time includes determining whether an event associated with a presence of a human was detected between the previous time and the current time. For example, the event correlation module 108 may determine whether a human was detected in images captured by the camera 112 between the previous time and the current time.

The system determines, based on the determination that the change does not correspond to a previously detected event, whether the images captured by the camera between the current time and the previous time depict an event (310). Event correlation module 108 can determine that the known object corresponding to the region of change 122 does not correlate to a known event in the event data 124. The event correlation module 108 can re-run historical imaging data 126 captured by the camera 112 between a time when the previous background image 118 was captured and when the new background image 120 was captured using event detectors 130 to determine if an event was missed by the object detection software 114 of the camera 112 that can be correlated with the known object identified in the new background image 120. Event detectors 130 can be selected to have higher sensitivity or increased recall with respect to the object detection software 114 of the camera 112.

The event detectors 130 can determine, from the historical imaging data 126, a new event correlated to the known object identified in the region of change 122, and provide updated event data to the stored event data. For example, a knocked over trashcan captured in the new background image 120 can be correlated to an event where a cat knocked over the trashcan between the previous background image 118 and the new background image 120. In some implementations, the process 300 includes, based on determining that the images captured by the camera between the current time and the previous time depict an event, providing an indication of the event. For example, in response to the event correlation module 108 determining that the images captured by the camera 112 between the current time and the previous time depict an event that was not previously detected, the system 102 may provide an alert that the event occurred to a user.

In some implementations, the process 300 includes, based on determining that the images captured by the camera between the current time and the previous time do not depict an event, determining to use the image to determine whether a future image depicts a change in a region. For example, the background update module 110 can update the stored background image 128 for the camera 112 to be the new background image 120, such that a next background image captured by the camera 112 is compared to the preceding background image captured by the camera 112. In some implementations, the new background image 120 may be updated as the stored background image 128 regardless of whether an event was detected between the current time and the previous time as long as the new background image 120 was determined to only show moving objects in a foreground.

In some embodiments, e.g., when an embedded device (e.g., a camera) needs to reduce power usage (e.g., to prevent overheating), the system can de-activate an event detection mode for the embedded device (or receive a notification that the event detection mode for the embedded device has been deactivated) and utilize the retroactive event detection system to perform the event detection on the images captured by the camera. In some embodiments, the retroactive event detection system can determine, based on the determination that the change depicted in the image is a known image type (e.g., as described in 306), whether the images captured by the camera between the current time and the previous time depict an event. The retroactive event detection system can continue to run a retroactive event detection process to capture discrepancies in background images and detect events.

Figure 4A:
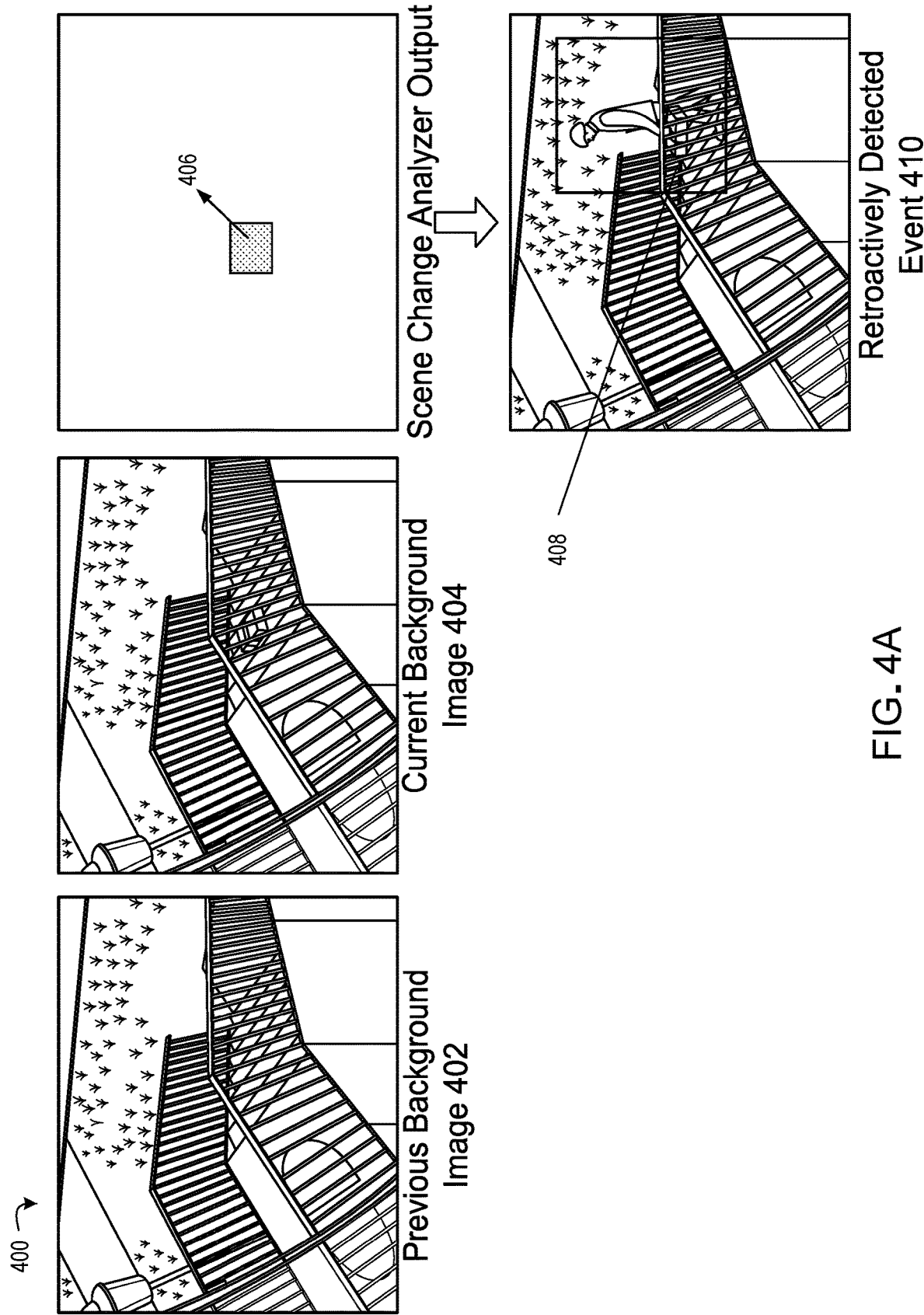
FIGS. 4A-4C depict example block diagrams of scene-change analysis performed by the retroactive event detection system.
Figure 4B:
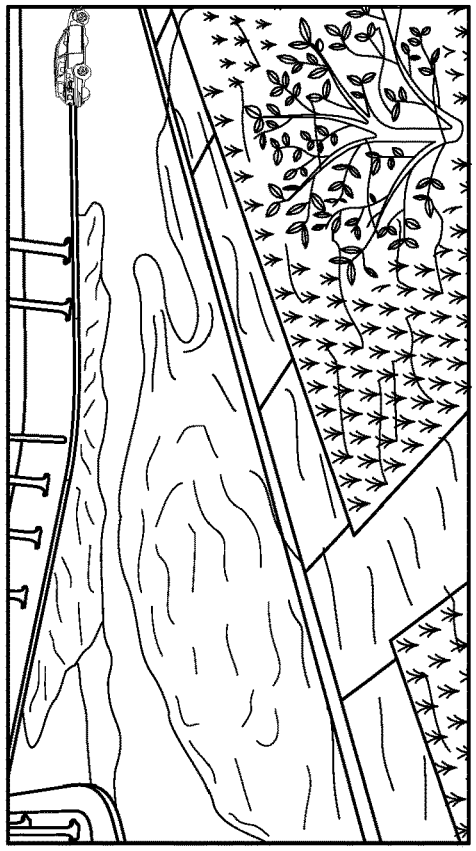
Figure 4B:
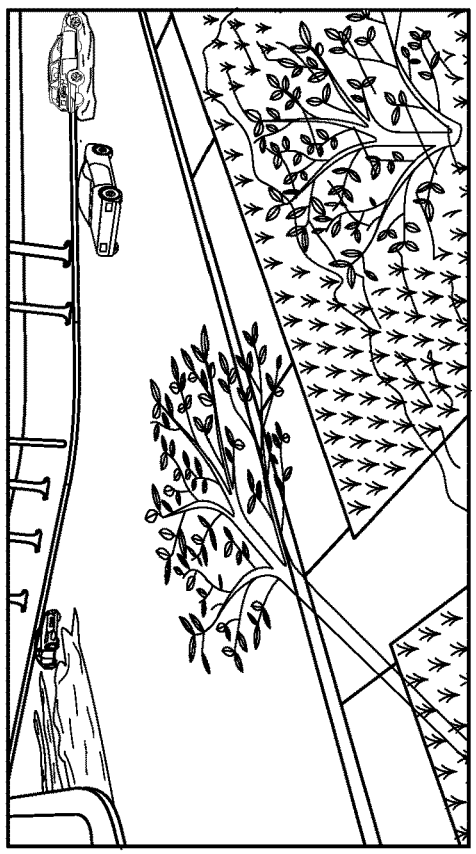
Figure 4B:
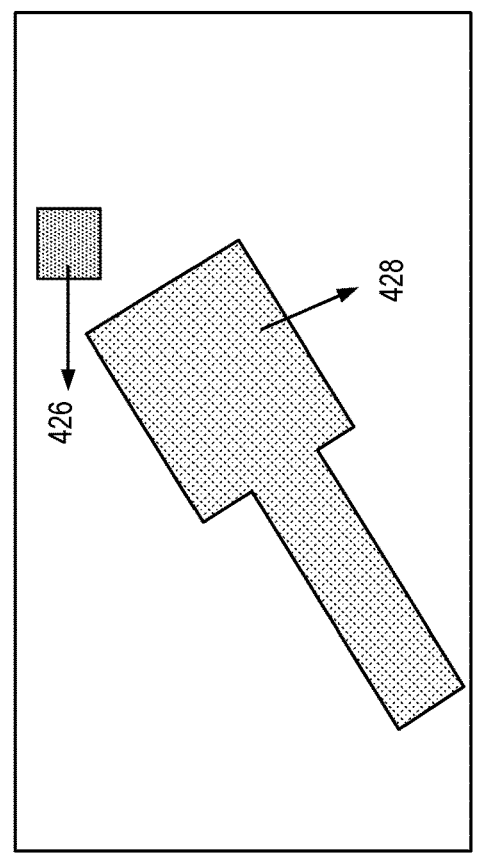
Figure 4C:
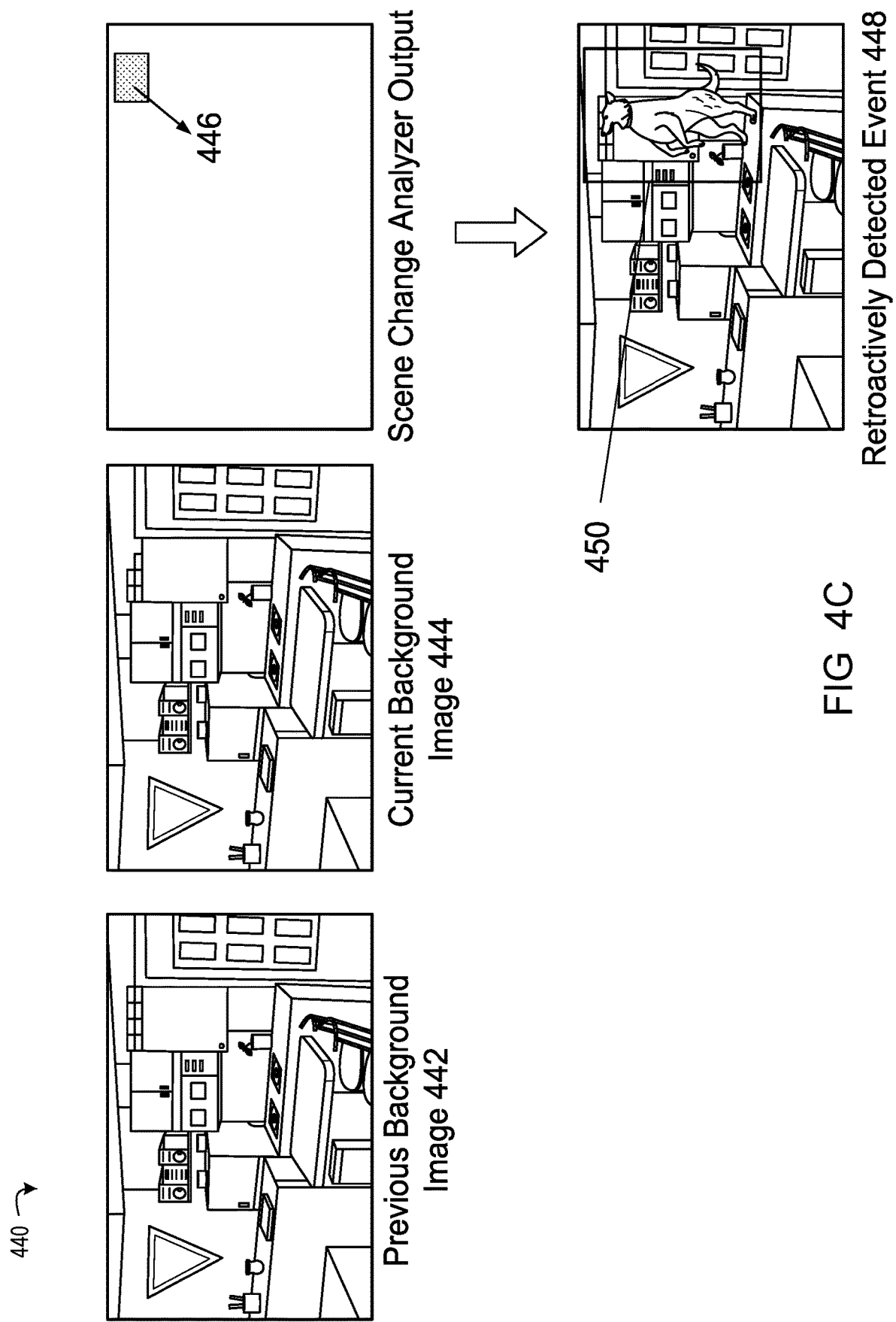

FIGS. 4A-4C depict example block diagrams of scene-change analysis performed by the retroactive event detection system. As depicted in FIG. 4A, an example scenario includes a previous background image 402 captured at a T=T0 and includes a scene of a front porch of a home and steps leading down to a walkway. Current background image 404 captured at T=T1 (e.g., +5 minutes after the capture of the previous background image 402) includes an additional region of localized change 406 (e.g., region of localized change 122). An output of a background detection module, e.g., background identification module 104, can identify the scene of localized change 406 which is provided to a scene-change analyzer module, e.g., scene-change analyzer module 106. The region of localized change 406 can be identified, e.g., using objection recognition techniques and one or more object models/classifiers, as a package 408 (e.g., as described with reference to step 206 of FIG. 2). The output of the scene-change analyzer can be provided to an event correlation module, e.g., event correlation module 108, where event data 124 can be analyzed to correlate the package 408 to an event 410, e.g., person dropping off package 408 on the porch (e.g., as described with reference to step 208 of FIG. 2).

As depicted in FIG. 4B, another example scenario 420 includes a previous background image 422 captured at a T=T0 and includes a scene of a street and a portion of a yard of a home. Current background image 424 captured at T=T1 (e.g., at a next point when the camera processing volume is below a threshold amount), includes regions of localized change 426 and 428. Region of localized change 426 can be identified, e.g., using object recognition techniques and one or more object models/classifiers, as a car. Region of localized change 428 can be identified by scene-change analyzer module 106 to be an unknown object. Scene-change analyzer module 106 can determine, based on a long-term background modeling, e.g., from a gradient map of the scene, that the region of localized change 428 is as result of a typical event (e.g., a shadow of a tree), as described with reference to step 212 in FIG. 2.

As depicted in FIG. 4C, another example scenario 440 includes a previous background image 442 captured at a T=T0 and includes a scene of a kitchen inside a home. Current background image 444 captured at T=T1 (e.g., 8 minutes after T0), includes a region of localized change 446. Region of localized change 426 can be identified by scene-change analyzer module 106 to be an unknown object. Scene-change analyzer module 106 can determine, based on long-term background modeling, that the region of localized change 428 is as result of an atypical event. Event correlation module 108 can further determine, from historical imaging data 126, if the atypical event that is the region of localized change 446 is as result of a previously undetected event or can be correlated to a previously detected event in the event data 124. As depicted in FIG. 4C, the region of localized change 446 can be correlated to a previously undetected event 448 in the historical imaging data (as described with reference to step 210 in FIG. 2), where the event 448 is a dog 450 moving some of the stored containers above the cabinet.

Figure 5:
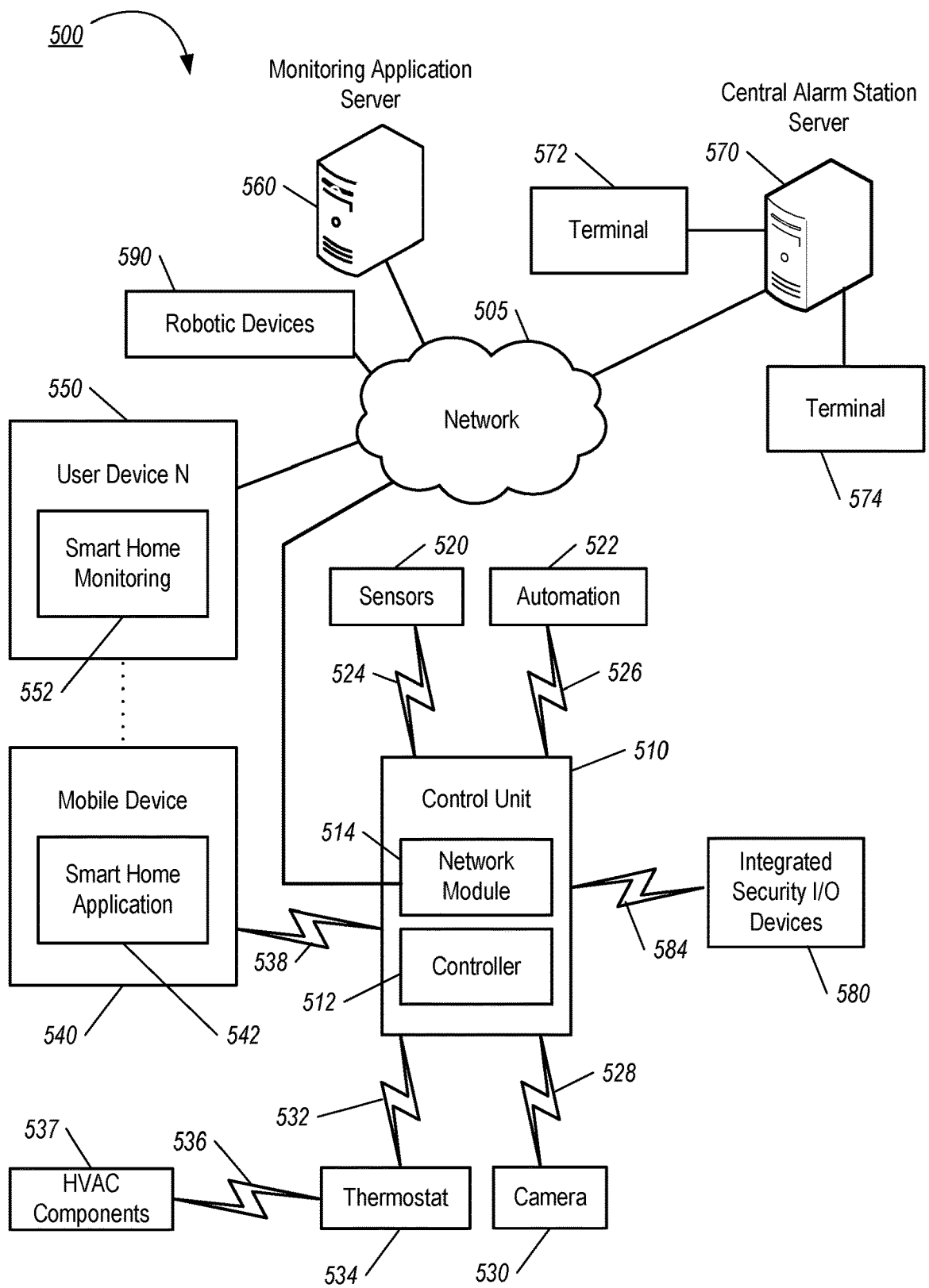
FIG. 5 is a diagram illustrating an example of a property monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., a user). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    maintaining, in computer memory, a background image that depicts a scene of a region, was captured by a camera at a first time, and is used to determine an action to perform given a determined change in the scene of the region;
    obtaining an image depicting the region and captured by the camera at a second time that is different from the first time;
    determining that the image depicts a change in the scene of the region from the background image, wherein determining that the image depicts the change comprises comparing the image to the background image;
    determining, based on determining that the image depicts the change in the region, whether the change depicted in the image is of a known object type;
    determining, based on the determination that the change depicted in the image is of a known object type, whether the change does not correspond to a previously detected event; and
    in response to determining that the change does correspond to a previously detected event, generating an updated background image for the region.

2. The method of claim 1, wherein determining, based on determining that the image depicts the change in the region, whether the change depicted in the image is of a known object type comprises determining that the change is of a package type.

3. The method of claim 1, wherein obtaining the image depicting the region and captured by the camera at the second time comprises:
   determining that a human is not detected in the image.

4. The method of claim 1, comprising:
   in response to determining that the change does correspond to a previously detected event, determining to use the updated background image to determine whether a future image depicts another change in the region.

5. A system comprising:
   one or more computers and one or more storage devices storing instructions that are operable, when executed by the one or more computers, to cause the one or more computers to perform operations comprising:
      maintaining, in computer memory, a background image that depicts a scene of a region, was captured by a camera at a first time, and is used to determine an action to perform given a determined change in the scene of the region;
      obtaining an image depicting the region and captured by the camera at a second time that is different from the first time;
      determining that the image depicts a change in the scene of the region from the background image, wherein determining that the image depicts the change comprises comparing the image to the background image;
      determining, based on determining that the image depicts the change in the region, whether the change depicted in the image is of a known object type;
      determining, based on the determination that the change depicted in the image is of a known object type and using first settings, whether the change does not correspond to a previously detected event; and
      in response to determining that the change does not correspond to a previously detected event, repeating event detection with second settings, different from the first settings, during an interval between the first time and the second time.

6. The system of claim 5, wherein determining, based on the determination that the change depicted in the image is of the known object type and using the first settings, whether the change does not correspond to the previously detected event comprises:
   determining that an event was not detected between the first time and the second time; and
   based on determining that an event was not detected between the first time and the second time, determining that the change does not correspond to a previously detected event.

7. The system of claim 6, wherein determining, based on determining that the image depicts the change in the region, whether the change depicted in the image is of a known object type comprises determining that the change is of a package type, and
   wherein determining that an event was not detected between the first time and the second time comprises determining whether a package delivery event was detected between the first time and the second time.

8. The system of claim 6, wherein determining that an event was not detected between the first time and the second time comprises:
   determining whether an event associated with a presence of a human was detected between the first time and the second time.

9. The system of claim 5, wherein obtaining the image depicting the region and captured by the camera at the second time comprises:
   determining that a human is not detected in the image.

10. The system of claim 5, comprising:
    based on determining that images captured by the camera between the second time and the first time depict an event, providing an indication of the event.

11. The system of claim 5, wherein the operations comprise:
    in response to repeating event detection with second settings, detecting an event of interest.

12. A non-transitory computer-readable medium storing software comprising instructions executable by one or more computers which, upon such execution, cause the one or more computers to perform operations comprising:
    maintaining, in computer memory, a background image that depicts a scene of a region, was captured by a camera at a first time, and is used to determine an action to perform given a determined change in the scene of the region;
    for each of a plurality of images:
       obtaining the image depicting the region and captured by the camera at a second time that is different from the first time;
       determining that the image depicts a change in the scene of the region from the background image, wherein determining that the image depicts the change comprises comparing the image to the background image;
       determining, based on determining that the image depicts the change in the region, whether the change depicted in the image is of a known object type; and
       determining, based on the determination that the change depicted in the image is of the known object type and using first settings, whether the change does not correspond to a previously detected event;
    for a first image from the plurality of images and in response to determining that the change does correspond to a previously detected event, generating an updated background image for the region; and
    for a second image from the plurality of images and in response to determining that the change does not correspond to a previously detected event, repeating event detection with second settings, different from the first settings, during an interval between the second time and the first time.

13. The computer-readable medium of claim 12, wherein determining, based on the determination that the change depicted in the image is of the known object type and using the first settings, whether the change does not correspond to a previously detected event comprises:
    determining whether an event was detected between the first time and the second time; and
    based on determining that an event was not detected between the first time and the second time, determining that the change does not correspond to a previously detected event.

14. The computer-readable medium of claim 13, wherein determining, based on determining that the image depicts the change in the region, whether the change depicted in the image is of the known object type comprises determining that the change is of a package type, and wherein determining whether an event was detected between the first time and the second time comprises determining whether a package delivery event was detected between the first time and the second time.

15. The computer-readable medium of claim 13, wherein determining whether an event was detected between the first time and the second time comprises:
   determining whether an event associated with a presence of a human was detected between the first time and the second time.

16. The computer-readable medium of claim 12, wherein obtaining an image captured by a camera at a second time comprises:
   determining that a human is not detected in the image.

17. The computer-readable medium of claim 12, wherein the operations comprise:
   based on determining that the images captured by the camera between the second time and the first time depict an event, providing an indication of the event.

18. The computer-readable medium of claim 12, wherein the operations comprise:
   in response to determining that the change does correspond to a previously detected event, determining to use the updated background image to determine whether a future image depicts another change in the region.

* * * * *